(12) United States Patent
Kim et al.

(10) Patent No.: US 9,022,630 B2
(45) Date of Patent: May 5, 2015

(54) DISPLAY MODULE AND APPARATUS HAVING THE SAME

(71) Applicant: Samsung Display Co., Ltd., Yongin, Gyeonggi-Do (KR)

(72) Inventors: Dong-Hoon Kim, Suwon-si (KR); Se-Ki Park, Asan-si (KR); Seung-Hwan Chung, Asan-si (KR); Jin-Sung Choi, Cheonan-si (KR); Chul-Hyun Choi, Yongin-si (KR); Seung-Hwa Ha, Cheongju-si (KR); Seong-Yong Hwang, Asan-si (KR)

(73) Assignee: Samsung Display Co., Ltd. (KR)

( * ) Notice: Subject to any disclaimer, the term of this patent is extended or adjusted under 35 U.S.C. 154(b) by 210 days.

(21) Appl. No.: 13/693,573

(22) Filed: Dec. 4, 2012

(65) Prior Publication Data

US 2013/0163277 A1    Jun. 27, 2013

(30) Foreign Application Priority Data

Dec. 26, 2011 (KR) .................. 10-2011-0142592

(51) Int. Cl.
G02F 1/1333 (2006.01)
F21V 5/02 (2006.01)
G02F 1/1335 (2006.01)
G02B 5/04 (2006.01)

(52) U.S. Cl.
CPC ............ *F21V 5/02* (2013.01); *G02F 1/133606* (2013.01); *G02B 5/045* (2013.01)

(58) Field of Classification Search
USPC .................. 362/607, 616, 620, 97.1–97.4
See application file for complete search history.

(56) References Cited

U.S. PATENT DOCUMENTS

| 7,465,083 B2* | 12/2008 | Ohkawa ..................... 362/616 |
| 7,853,057 B2* | 12/2010 | Matsumoto .................. 382/128 |
| 8,210,731 B2* | 7/2012 | Iwasaki ....................... 362/615 |
| 2002/0105793 A1* | 8/2002 | Oda et al. ..................... 362/31 |
| 2008/0049451 A1* | 2/2008 | Wang et al. .................. 362/620 |
| 2010/0149452 A1 | 6/2010 | Harada et al. |

FOREIGN PATENT DOCUMENTS

| JP | 4135092 B2 | 6/2008 |
| KR | 1020100073840 A | 7/2010 |
| KR | 20100126393 A | 12/2010 |

* cited by examiner

*Primary Examiner* — Anabel Ton
(74) *Attorney, Agent, or Firm* — Cantor Colburn LLP

(57) ABSTRACT

A display module includes a display panel including a display area and a non-display area, an upper prism layer including a plurality of parallel upper prisms at a lower surface thereof, wherein the plurality of the upper prisms are parallel to one another, a lower prism layer including a plurality of lower prisms at a lower surface thereof, wherein the plurality of the lower prisms are parallel to one another and extend in a substantially perpendicular direction to the upper prisms, and an adhesive part which is at a side of the upper prism layer and is adhered to the lower prism layer and the non-display area of the display panel, wherein the adhesive part fixes the upper prism layer and the lower prism layer to each other.

19 Claims, 8 Drawing Sheets

DISPLAY MODULE AND APPARATUS HAVING THE SAME

This application claims priority to Korean Patent Application No. 10-2011-0142592, filed on Dec. 26, 2011, and all the benefits accruing therefrom under 35 U.S.C. §119, the content of which in its entirety is herein incorporated by reference.

BACKGROUND

1. Field

Exemplary embodiments of the invention relate to a display module and an apparatus having the display module. More particularly, exemplary embodiments of the invention relate to a display module that does not include a light guide plate and an apparatus having the display module.

2. Discussion of the Related Art

Generally a display apparatus includes a display panel displaying an image and a backlight assembly providing light to the display panel. The backlight assembly includes a light guide plate ("LGP"), which guides light from a light source toward the display panel.

The backlight assembly is classified into an edge type and a direct type according to the position of the light source. In the direct type backlight assembly, the number of light sources is increased, such that the thickness of the backlight assembly is increased. In the edge type backlight assembly, since the light source is disposed at sidewalls of the backlight assembly, the LGP is needed to guide the light toward the display panel.

Thus, the conventional edge type backlight assembly necessarily requires the LGP. Normally, the LGP guides the light upwardly toward the display panel, and the light is provided in a lateral direction with respect to the LGP. Moreover, in order to provide the light toward the display panel, higher brightness and uniformity of the light is desired. In order to provide the higher brightness and uniformity of the provided light, the LGP includes a specific structure of a certain thickness or includes a prism. However, since the LGP has the specific structure, the thickness of the LGP is also increased. In consequence, designing a slim type display apparatus becomes difficult.

SUMMARY

Exemplary embodiments of the invention provide a display module that does not use a light guide plate.

Exemplary embodiments of the invention also provide a display apparatus having the display module.

According to an exemplary embodiment of the invention, a display module includes a display panel including a display area and a non-display area, an upper prism layer including a plurality of upper prisms at a lower surface thereof, wherein the plurality of the upper prisms are parallel to one another, a lower prism layer including a plurality of lower prisms at a lower surface thereof, wherein the plurality of the lower prisms are parallel to one another and extend in a substantially perpendicular direction to the upper prisms, and an adhesive part which is at a side of the upper prism layer and is adhered to the lower prism layer and the non-display area of the display panel, wherein the adhesive part fixes the upper prism layer and the lower prism layer to each other.

In an exemplary embodiment, the lower prisms of the lower prism layer may extend toward a light source.

In an exemplary embodiment, the lower prism layer may further include an adhesive area to which the adhesive part is adhered to, and the adhesive area may be correspond to the non-display area of the display panel and may be in proximity of the lower prisms.

In an exemplary embodiment, the lower prism layer may include an elastic base film.

In an exemplary embodiment, the adhesive part may be adhered to a side of the display area of the display panel and the non-display area of the display panel.

In an exemplary embodiment, the adhesive part may include resin.

In an exemplary embodiment, a vertex angle of each of the upper prisms may be from about 50 degrees to about 70 degrees.

In an exemplary embodiment, a vertex angle of each of the lower prisms may be from about 80 degrees to about 120 degrees.

In an exemplary embodiment, a vertex angle of each of the upper prisms may be from about 55 degrees to about 65 degrees, and a vertex angle of each of the lower prisms may be from about 95 degrees to about 105 degrees.

In an exemplary embodiment, a vertex angle of each of the upper prisms may be from about 70 degrees to about 80 degrees, and a vertex angle of each of the lower prisms may be from about 110 degrees to about 120 degrees.

In an exemplary embodiment, a vertex angle of each of the upper prisms may be from about 65 degrees to about 75 degrees, and a vertex angle of each of the lower prisms may be from about 105 degrees to about 115 degrees.

In an exemplary embodiment, the display module may further include a diffusive layer between the lower prism layer and the display panel.

In an exemplary embodiment, the diffusive layer may include a diffusive bead.

In an exemplary embodiment, the display module may further include a polarized layer between the upper prism layer and the display panel.

According to another exemplary embodiment of the invention, a display apparatus include an upper frame, a display module, a lower frame which is coupled with the upper frame and a light source module at a side of the lower frame. The display module includes a display panel including a display area and a non-display area, an upper prism layer including a plurality of upper prisms at a lower surface thereof, wherein the plurality of the upper prisms are parallel to one another, a lower prism layer including a plurality of lower prisms at a lower surface thereof, wherein the plurality of the lower prisms are parallel to one another and extend in a substantially perpendicular direction to the upper prisms, and an adhesive part which is at a side of the upper prism layer and is adhered to the lower prism layer and the non-display area of the display panel, wherein the adhesive part fixes the upper prism layer and the lower prism layer to each other.

In an exemplary embodiment, the lower prisms of the lower prism layer of the display module may extend toward the light source module.

In an exemplary embodiment, the lower prism layer of the display module may further include an adhesive area to which the adhesive part is adhered to, and the adhesive area may correspond to the non-display area of the display panel and may be in proximity of the lower prisms, and the adhesive part may be adhered to a side of the display area of the display panel and the non-display area of the display panel.

In an exemplary embodiment, a vertex angle of each of the upper prisms may be about 70 degrees, and a vertex angle of each of the lower prisms may be about 110 degrees.

In an exemplary embodiment, the display apparatus may further include a reflective sheet at a bottom portion of the lower frame.

In an exemplary embodiment, the light source module may include two light source sub modules, and the two light source sub modules are at opposing sides of the lower frame.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
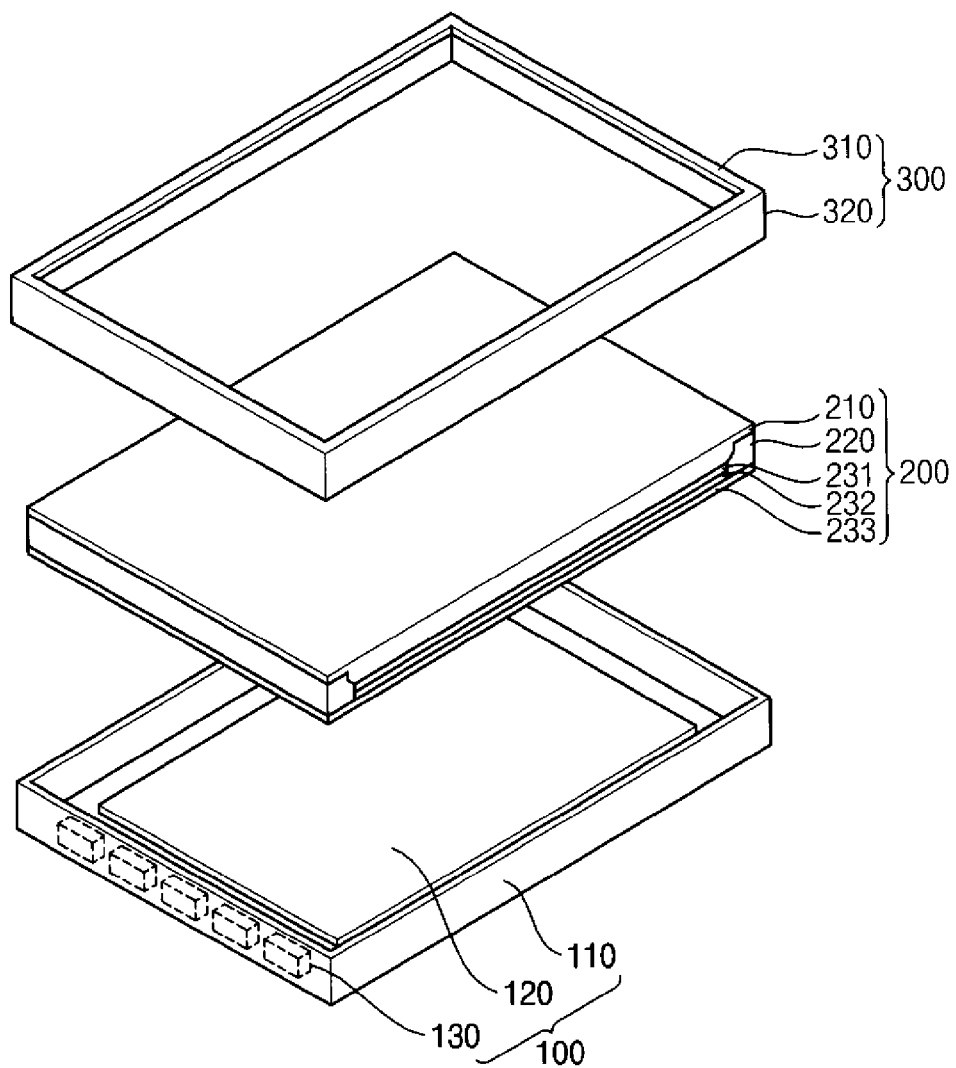
FIG. 1 is an exploded perspective view illustrating an exemplary embodiment of a display apparatus in accordance with the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in further detail with reference to the accompanying drawings.

FIG. 1 is an exploded perspective view illustrating an exemplary embodiment of a display apparatus in accordance with an embodiment of the invention.

Referring to FIG. 1, a display apparatus in accordance with an exemplary embodiment of the invention includes a lower frame 100, a display module 200, an upper frame 300 and a light source module 130 disposed in the lower frame 100.

The upper frame 300 includes a bezel part 310 and a sidewall part 320. The bezel part 310 covers a non-display area of the display module 200 and fixes the display module 200. The sidewall part 320 may cover a sidewall of the display module 200. In an alternative embodiment, a sidewall part of the lower frame 100 may cover the sidewall of the display module 200.

The lower frame 100 forms an outer shape of the display apparatus by coupling with the upper frame 300. The lower frame 100 includes a sidewall 110 and a bottom part. The lower frame 100 further includes the light source module 130. The light source module 130 may be formed at one of the sidewall 110 or may be formed at two sidewalls of the sidewall 110 that face each other.

The lower frame 100 may further include a reflective sheet 120 disposed at the bottom part thereof. The reflective sheet 120 reflects the light supplied from the light source module 130. In an exemplary embodiment, an additional treatment such as a silver coating for enhancing a reflective ratio is not needed. In an exemplary embodiment, the reflective sheet having a normal reflective ratio may be used. In an alternative embodiment, a silver-reflective sheet may be used as the reflective sheet 120. The reflective sheet 120 does not need an additional pattern treatment for adjusting the reflective ratio or a local diffusive ratio thereof. Namely, the reflective sheet 120 of an exemplary embodiment can be a normal reflective sheet without a silver-reflective treatment or a diffusive pattern treatment.

The display module 200 includes a display panel 210, an adhesive part 220, a diffusive layer 231, an upper prism layer 232 and a lower prism layer 233. The display panel 210 includes a display area and a non-display area. The display area displays an image according to an input image signal. The non-display area does not display an image. In the non-display area, a driving part or a control part for driving the display area may be disposed. The bezel part 310 of the upper frame 300 is formed corresponding to the non-display area.

A plurality of optical films is disposed under the display panel 210. The optical films include the diffusive layer 231, the upper prism layer 232 and the lower prism layer 233. The lower prism layer 233 is disposed at a bottom, and the diffusive layer 231 and the upper prism layer 232 may be disposed on the lower prism layer 233. It should be noted that positioning of the diffusive layer 231 and the upper prism layer 232 may be changed according to design choice. Also, additional optical films may be disposed. In an exemplary embodiment, for example, a polarized layer may be disposed between the upper prism layer 232 and the diffusive layer 231 or between the diffusive layer 231 and the display panel 210. Since the optical films are fixed by the lower prism layer 233, other optical films may be inserted between the display panel 210 and the lower prism layer 233.

The adhesive part 220 is disposed at a side of the diffusive layer 231 and the upper prism layer 232. The adhesive part 220 adheres to the lower prism layer 233 and the display panel 210 at a peripheral area thereof so that the lower prism layer 233 fixes the optical sheets provided on the lower prism layer 233. In an exemplary embodiment, the lower prism layer 233 fixes the diffusive layer 231 and the upper prism layer 232. Also, the adhesive part 220 is adhered to the non-display area of the display panel 210. Alternatively, the adhesive part 220 may be adhered to a side of the display area of the display panel 210.

The display module 200 includes the display panel 210, the adhesive part 220, the diffusive layer 231, the upper prism layer 232 and the lower prism layer 233, which are formed in one body. Thus, the display module 200 may be separately manufactured and assembled with the lower frame 100 and the upper frame 300 through an assembly process. Thus, according to the invention, the manufacturing process of the display apparatus may be simplified.

Figure 2:
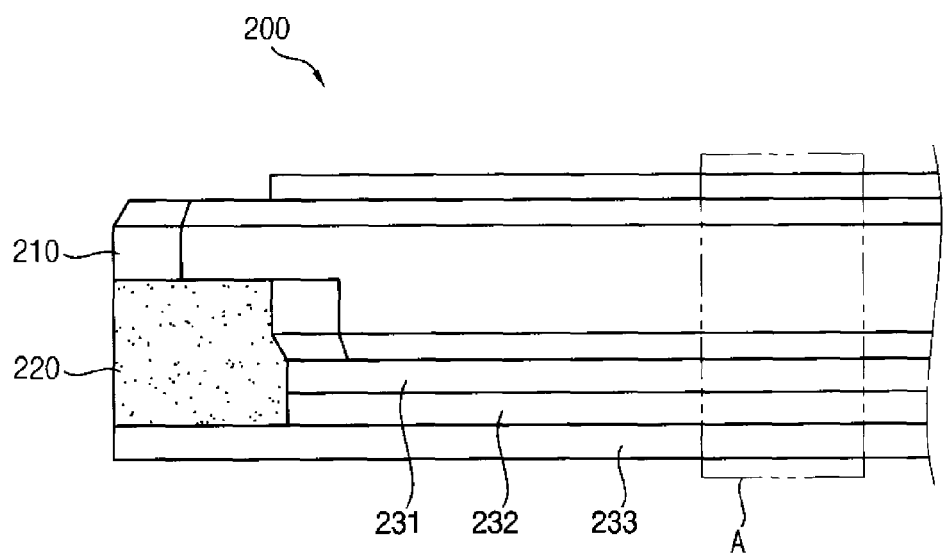
FIG. 2 is a cross-sectional view of a display panel of the display apparatus in FIG. 2.

FIG. 2 is a cross-sectional view of the display panel of the display apparatus in FIG. 2.

Referring to FIG. 2, the display module 200 includes the display panel 210, the adhesive part 220, the diffusive layer 231, the upper prism layer 232 and the lower prism layer 233. The diffusive layer 231 and the upper prism layer 232 are disposed between the display panel 210 and the lower prism layer 233, and the diffusive layer 231 and the upper prism layer 232 are fixed to the display panel 210 and the lower prism layer 233 by using the adhesive part 220.

The adhesive part 220 is disposed at a side of the diffusive layer 231 and the upper prism layer 232. The adhesive part 220 is disposed corresponding to the non-display area of the display panel 210. The adhesive part 220 is disposed at an adhesive area of the lower prism layer 233. The lower prism layer 233 may include the adhesive area, to which the adhesive part 220 can be adhered, the adhesive area being at a peripheral area of the lower prism layer 233. Because of the adhesive area, the lower prism layer 233 may be formed larger than other optical films such as the diffusive layer 231 of the upper prism layer 232. In order to fix the lower prism layer 233 to the display panel 210 by using the adhesive part 220, the lower prism layer 233 may include an elastic base film. Unlike the upper prism layer 231, the lower prism layer 233 may include a different material for supporting the optical films positioned above the lower prism layer 233. In an exemplary embodiment, the lower prism layer 233 may be formed thicker than other optical films.

The adhesive part 220 adheres to the adhesive area of the lower prism layer 233 and to the non-display area of the display panel 210 and may include resin. The adhesive part 220 has a height corresponding to a gap between the lower prism layer 233 and the display panel 210. The adhesive part 220 may be adhered to the side of the display area of the display panel 210 as well as the non-display area of the display panel 210. Since the adhesive part 220 has a certain height, the adhesive part 220 may be adhered to other components at a side thereof. Thus, in order to enhance adhesive power between the adhesive part 220 and the display panel 210, the adhesive part 220 may be adhered to the side of the display area as well as the non-display area of the display panel 210. Further, the adhesive part 220 may be adhered to the side of the diffusive layer 231 and the upper prism layer 232. Alternatively, according to design choice, the adhesive part 220 may be formed spaced apart from the diffusive layer 231 and the upper prism layer 232.

The adhesive part 220 is disposed at both sides of the display panel 210 in FIG. 1. In an alternative embodiment, the adhesive part 220 may be disposed at four sides of the display panel 210 in order to enhance the adhesive power between the adhesive part 220 and the display panel 210. Thus, the adhesive part 220 may be disposed on four sides of the display panel 210. Also, the adhesive part 220 may be positioned discontinuously. In an exemplary embodiment, for example, a plurality of the adhesive part 220 may be positioned at a certain interval along the non-display area at the side of the display panel 210. The adhesive part 220 may be positioned in various different ways such that adhesive efficiency and a manufacturing process may be improved.

Figure 3A:
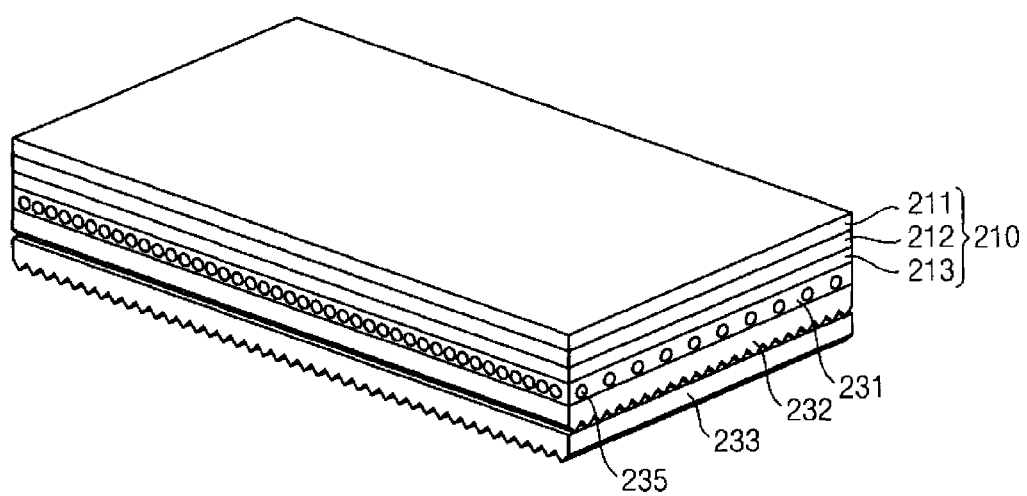
FIG. 3A is a perspective view of a cut part 'A' of the display panel in FIG. 2.

FIG. 3A is a perspective view of a cut part 'A' of the display panel in FIG. 2.

Referring to FIG. 3A, the display module 200 in accordance with an exemplary embodiment of the invention includes the display panel 210, the diffusive layer 231, the upper prism layer 232 and the lower prism layer 233. The display panel 210 further includes an upper panel 211, a liquid crystal layer 212 and a lower panel 213. The display panel 210 may be a liquid crystal display panel, which displays an image according to a change of a transmittance ratio in the liquid crystal layer 212 disposed between the lower panel 213 and the upper panel 211. The diffusive layer 231 is disposed under the display panel 210. Alternatively, the diffusive layer 231 may be disposed under the upper prism layer 232. Since the lower prism layer 233 fixes the optical films, the optical films may be disposed in various positions as long as the optical films are disposed on the lower prism layer 233. The diffusive layer 231 may include a plurality of diffusive beads 235. The diffusive layer 231 may include diffusive patterns at a surface thereof.

The diffusive layer 231 may include an adhesive material with a plurality of the diffusive beads 235 to adhere to the upper prism layer 232 and a low portion of the display panel 210. When the diffusive layer 231 includes the adhesive material, the upper prism layer 232 is fixed with the diffusive layer 231 by using the adhesive material of the diffusive layer 231 in addition to the adhesive part (not shown), so that the entire adhesive power may be enhanced.

Figure 3B:
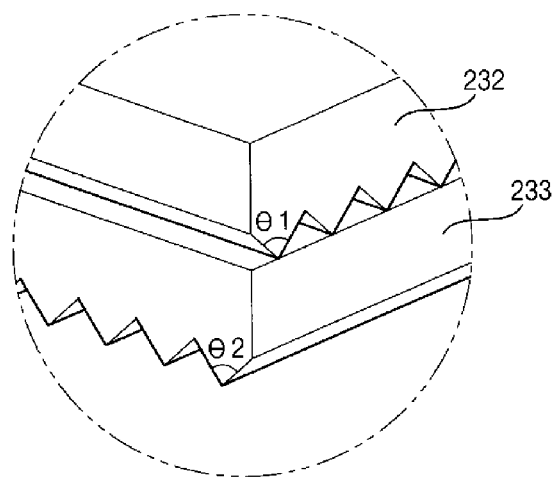
FIG. 3B is a perspective view illustrating an upper prism layer and a lower prism layer of the display panel in FIG. 3A.

FIG. 3B is a perspective view illustrating the upper prism layer 232 and the lower prism layer 233 of the display panel in FIG. 3A.

Referring to FIG. 3B, the upper prism layer 232 and the lower prism layer 233 include a plurality of upper prisms and lower prisms, respectively. The upper prism layer 232 includes a plurality of the upper prisms provided on a lower surface thereof. The upper prisms are disposed in parallel to each other. The upper prism has a first prism vertex angle θ1. The lower prism layer 233 includes a plurality of lower prisms provided on a lower surface of the lower prism layer 233. The lower prisms are disposed in parallel to each other. The lower prism has a second prism vertex angle θ2. Also, the lower prisms are extended in a direction substantially perpendicular to a direction in which the upper prisms are extended. The lower prisms may be arranged in a direction in which the light source is extended. In an exemplary embodiment, for example, when the light source is disposed at a side of the lower prism layer 233, the lower prisms of the lower prism layer 233 are extended in a direction substantially perpendicular to an extending direction of the light source. Since the upper prisms are arranged in a substantially perpendicular direction to the lower prisms, the upper prisms are arranged in a substantially perpendicular direction to the extending direction of the light source.

Conventionally, prisms are arranged in a perpendicular direction to the light source. In an exemplary embodiment, a light guide plate is not included, and thus, the lower prisms of the lower prism layer are arranged in a direction substantially parallel to the extending direction of the light sources.

Figure 4:
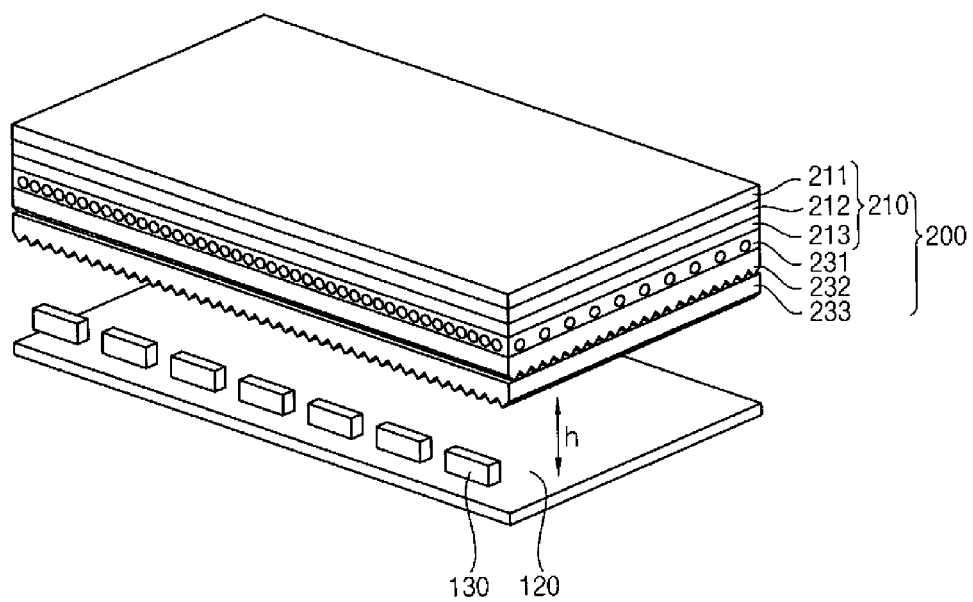
FIG. 4 is a perspective view illustrating the display panel in FIG. 3A and a light source.
Figure 5:
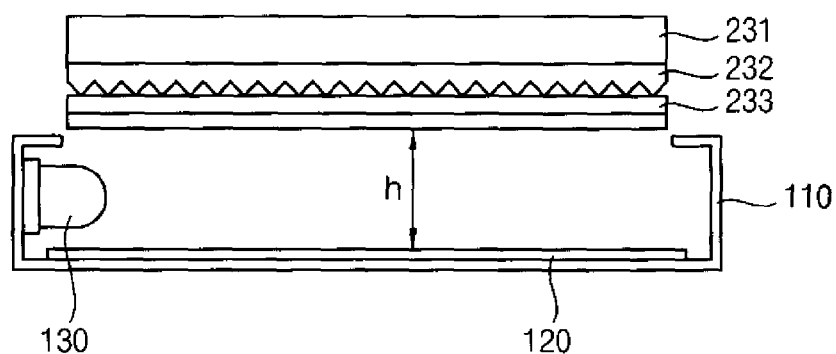
FIG. 5 is a cross-sectional view illustrating the display panel and the light source in FIG. 4.

FIG. 4 is a perspective view illustrating the display panel in FIG. 3A and a light source. FIG. 5 is a cross-sectional view illustrating the display panel and the light source in FIG. 4.

Referring to FIG. 4 and FIG. 5, the display apparatus of an exemplary embodiment includes the display module 200 and the lower frame 100. The display module 200 includes the display panel 210, the diffusive layer 231, the upper prism layer 232 and the lower prism layer 233. The configuration of the display module 200 has already been described in the exemplary embodiment of FIG. 3B. Thus, a repetitive description thereof will be omitted.

The light source module 130 is disposed under the display module 200. The lower frame 100 includes the light source module 130. The light source module 130 is formed at one side of the lower frame 100 and provides light toward an opposite sidewall (not shown) of the lower frame 100. The lower prisms of the lower prism layer 233 are arranged in a direction parallel to the extending direction of the light source module 130. The upper prisms of the upper prism layer 232 are arranged in a perpendicular direction to the extending direction of the light source module 130. The reflective sheet 120 is disposed at a bottom portion of the lower frame 100 and reflects the light.

The light guide plate is not provided between the reflective sheet 120 and the lower prism layer 233 of the display module 200. Namely, the display apparatus of an exemplary embodiment does not include the light guide plate. Since the light guide plate is not provided, a gap 'h' is defined between the reflective sheet 120 and the display module 200. An air gap is formed corresponding to the gap 'h' in replacement of the light guide plate to function as the light guide plate. The gap 'h' may be set differently according to a sort of the light source module 130 or the optical sheet included in the display module 200. The display module 200 of an exemplary embodiment includes the upper prism layer 232 and the lower prism layer 233 such that the gap 'h' is greatly smaller compared to other display apparatus.

Additionally, the light source module 130 may include a lens part (not shown). If the light generated by the light source module 130 proceeds in a substantially straight line direction, the light may be uniformly distributed. Thus, in order to provide light in a substantially straight line direction, the light source module 130 may include various lenses.

Figure 6:
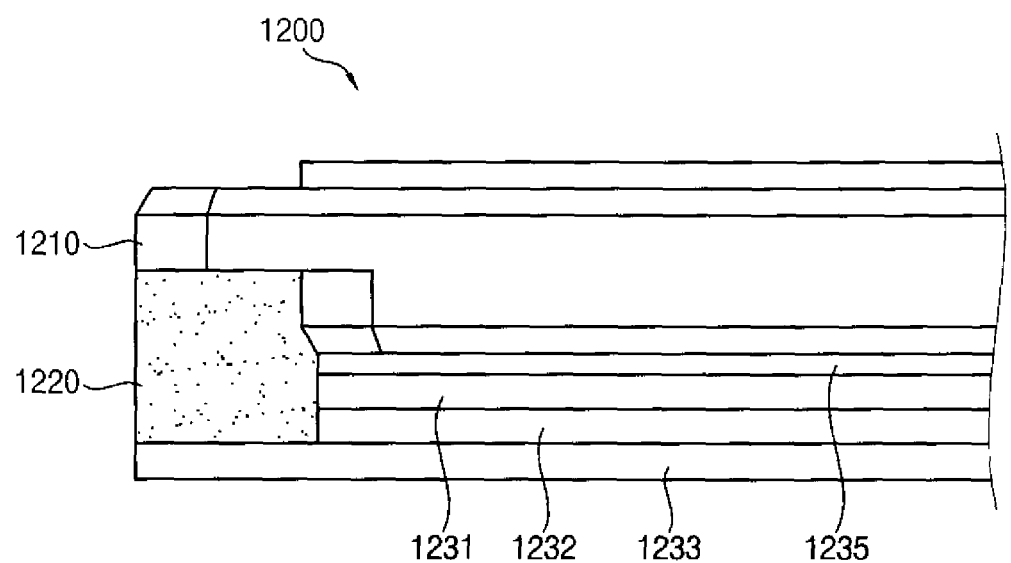
FIG. 6 is a cross-sectional view illustrating another exemplary embodiment of a display module in accordance with the invention.

FIG. 6 is a cross-sectional view illustrating another exemplary embodiment of a display module in accordance with the invention.

Referring to FIG. 6, a display module 1200 in accordance with another exemplary embodiment of the invention includes a display panel 1210, an adhesive part 1220, a diffusive layer 1231, an upper prism layer 1232, and a lower prism layer 1233. The diffusive layer 1231 and the upper prism layer 1232 are disposed between the display panel 1210 and the lower prism layer 1233, and are fixed by the adhesive part 1220, which adheres to the display panel 1210 and the lower prism layer 1233.

The display panel 1210, the adhesive part 1220, the diffusive layer 1231, the upper prism layer 1232 and the lower prism layer 1233 are substantially the same with the display panel 210, the adhesive part 220, the diffusive layer 231, the upper prism layer 232 and the lower prism layer 232 of the exemplary embodiment in FIG. 2. Thus, a repetitive description thereof will be omitted.

The display module 1200 further includes a polarized layer 1235. The polarized layer 1235 is disposed under the display panel 1210 and polarizes light provided thereto. In addition to the polarized layer 1235, various optical sheets may be added as needed as long as the optical sheets are disposed on the lower prism layer 1233. However, the number of the optical sheets that can be added may be limited depending on a maximum weight supportable by the adhesive power of the adhesive part 1220 bonded to the lower prism layer 1233 and the display panel 1210.

Figure 7:
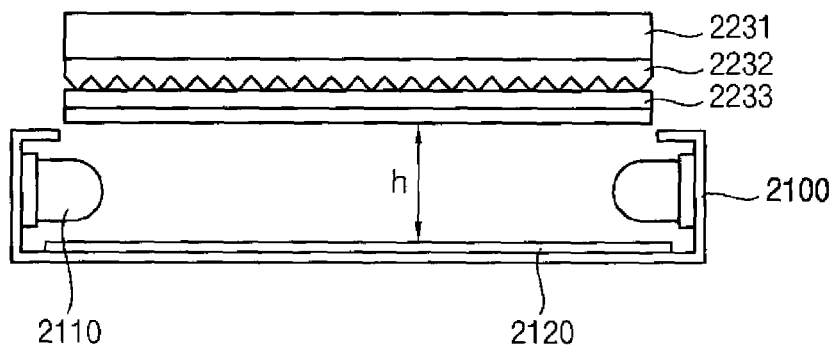
FIG. 7 is a partial cross-sectional view illustrating another exemplary embodiment of a display apparatus in accordance with the invention.

FIG. 7 is a partial cross-sectional view illustrating another exemplary embodiment of a display apparatus in accordance with the invention.

Referring to FIG. 7, the display apparatus of an exemplary embodiment includes a diffusive sheet 2231, an upper prism layer 2232, a lower prism layer 2233, and a lower frame 2100. The display apparatus of FIG. 7 includes elements that are substantially similar to those of the embodiment in FIG. 5.

Thus, a repetitive description thereof will be omitted. A light source module 2110 is disposed under the display module, a portion of which is shown in FIG. 7 including the diffusive sheet 2231, the upper prism layer 2232, and the lower prism layer 2233. The lower frame 2100 includes the light source module 2110. The light source module 2110 is formed at one side of the lower frame 2100 and provides light toward an opposing sidewall of the lower frame 2100. In an exemplary embodiment, two light source modules 2110 are disposed at opposing sidewalls of the lower frame 2100. When the length of the display panel 2231 is long or brightness needs to be increased, a plurality of the light source modules 2110 may be provided. In an exemplary embodiment, since the upper prism layer 2232 and the lower prism layer 2233 are formed in a symmetric structure, the same display module may be used when the two light source module 2110 are disposed to face to each other. Thus, two light source modules 2110 may be disposed at both opposing sidewalls of the lower frame 2100 in order to increase the brightness or improve light uniformity.

The lower frame 2100 may further include a reflective sheet 2120 disposed at a bottom part thereof. The reflective sheet 2120 reflects the light supplied from the light source module 2110.

Figure 8A:
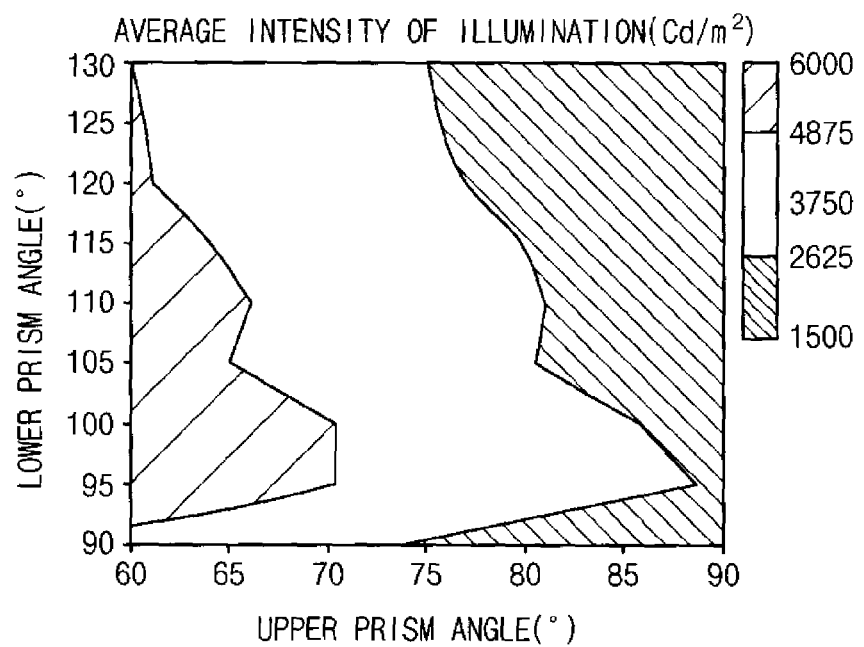
FIG. 8A and FIG. 8B are graphs illustrating illumination and uniformity of light with respect to angles of an upper prism and a lower prism of a display module of the invention.
Figure 8B:
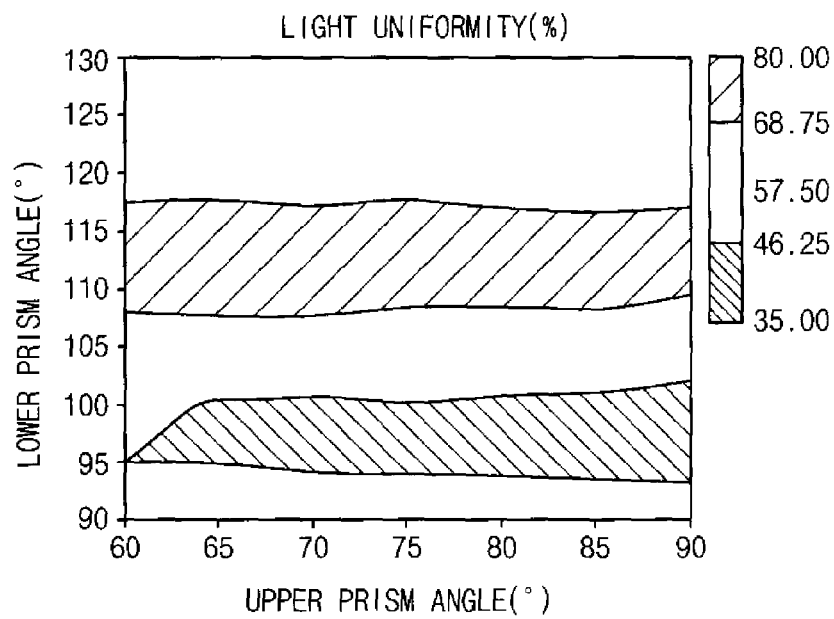

FIG. 8A and FIG. 8B are graphs illustrating illumination and uniformity of light with respect to angles of an upper prism and a lower prism of the display module of the invention.

FIG. 8A is a graph illustrating an average intensity of illumination according to respective vertex angles of the upper and lower prisms in accordance with the invention.

Referring to FIG. 8A, an x-axis represents a vertex angle in degrees (°) of the upper prism, and a y-axis represents a vertex angle in degrees (°) of the lower prism. The average intensity of illumination is measured according to the vertex angles of the upper and lower prisms. An average intensity of illumination from about 4875 to about 6000 candela per square meter ($Cd/m^2$) is measured when the vertex angle of the upper prism is from about 60 to about 70 degrees. An average intensity of illumination from about 2625 to about 4875 $Cd/m^2$ is measured when the vertex angle of the upper prism is from about 70 to about 80 degrees. An average intensity of illumination less than about 2625 $Cd/m^2$ is measured when the vertex angle of the upper prism is from about 80 to about 90 degrees.

Also, the vertex angle of the lower prism has influence on the brightness to a certain extent. However, as is shown in the graph of FIG. 8A, the vertex angle of the upper prism has more significant influence on the brightness than the vertex angle of the lower prism.

FIG. 8B is a graph illustrating light uniformity according to the vertex angles of the upper and lower prisms in accordance with the invention.

Referring to FIG. 8B, the x-axis represents a vertex angle in degrees (°) of the upper prism, and the y-axis represents a vertex angle in degrees (°) of the lower prism. An average light uniformity is measured according to the vertex angles of the upper and lower prisms. The average light uniformity is defined as a ratio of a minimum brightness to a maximum brightness on a same screen. A light uniformity of about 68.75% to about 80% is measured when the vertex angle of the lower prism is from about 108 to about 117 degrees. A light uniformity of about 46.25% to about 68.75% is measured when the vertex angle of the lower prism is higher than about 108 degrees or from about 100 to about 108 degrees or less than about 95 degrees. The light uniformity less than about 46.25% is measured when the vertex angle of the lower prism is from about 95 to about 100 degrees.

Also, the vertex angle of the upper prism has influence on the light uniformity to a certain extent. However, as shown in the graph of FIG. 8B, the vertex angle of the lower prism has more significant influence on the light uniformity than the vertex angle of the upper prism.

Thus, the average illumination is controlled primarily by the vertex angle of the upper prism angle, and the light uniformity is controlled primarily by the vertex angle of the lower prism angle. Based on the above, a desirable range of the vertex angles of the upper prism or the lower prism may be determined as follows.

When the vertex angle of the upper prism is within a range of, for example, about 50 to about 70 degrees, higher illumination may be obtained. Also, when the vertex angle of the lower prism is within a range of, for example, about 80 to about 120 degrees, higher light uniformity may be obtained. Thus, when the display module or the display apparatus is designed, the vertex angle of the upper prism may be designed to be in a range of about 50 to about 70 degrees and the vertex angle of the lower prism may be designed to be in a range of about 80 to about 120 degrees.

Figure 9A:
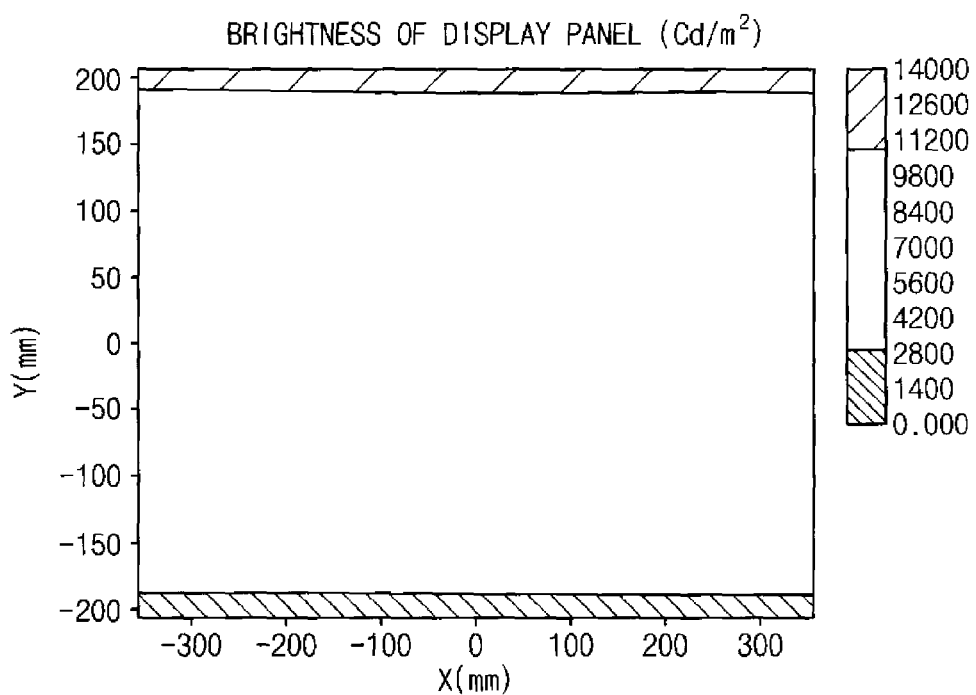
FIG. 9A to FIG. 9C are graphs illustrating brightness of light with respect to angles of an upper prism and a lower prism of a display panel of the invention.
Figure 9B:
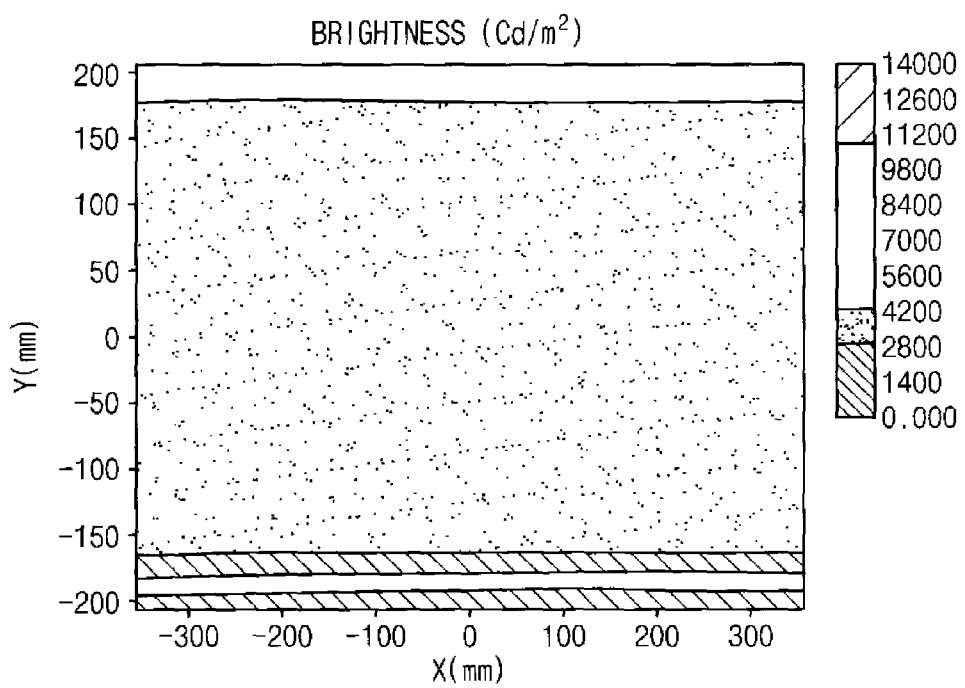
Figure 9C:
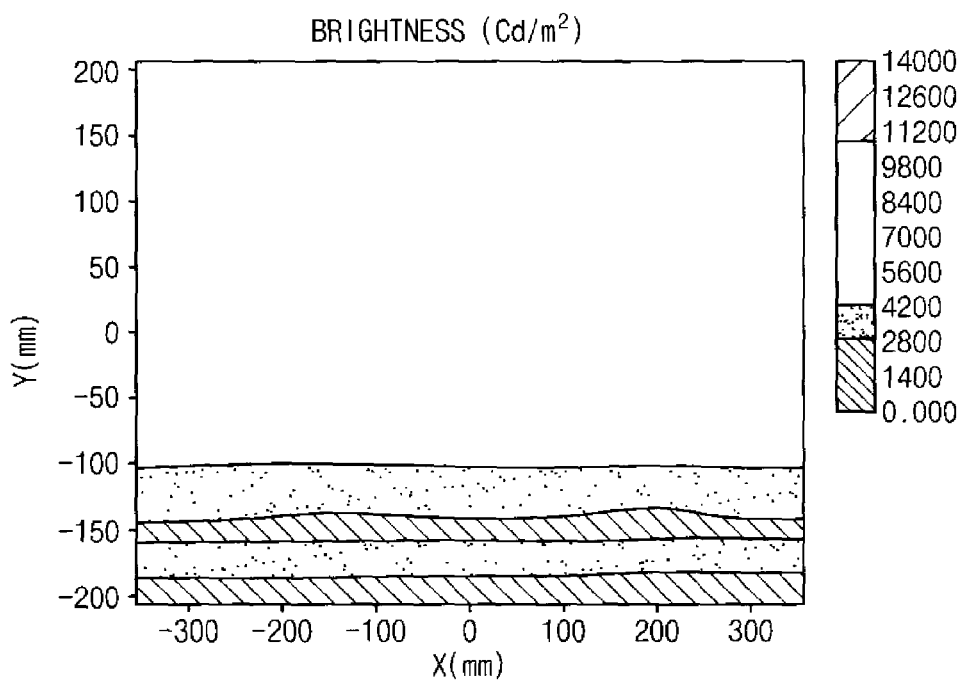

FIG. 9A to FIG. 9C are graphs illustrating brightness of light with respect to a relative position of the display panel of the invention. In FIGS. 9A to 9C, an x-axis and a y-axis respectively represent a relative position in millimeters (mm) of the display panel from a center point (0, 0).

FIG. 9A is a graph illustrating the brightness of the light of the display panel measured when the vertex angle of the upper prism is about 60 degrees and the vertex angle of the lower prism is about 100 degrees.

Referring to FIG. 9A, it is shown that, when the vertex angle of the upper prism is about 60 degrees and the vertex angle of the lower prism is about 100 degrees, higher brightness is measured in overall positions of the display panel. Also, brightness higher than about 11200 $Cd/m^2$ is measured in a top portion of the display panel and brightness lower than about 2800 $Cd/m^2$ is measured in a bottom portion of the display panel.

Usually, the uniformity of the light is degraded when the brightness is increased. In an exemplary embodiment, the average brightness is 5876.52 $Cd/m^2$ and brightness in a center portion is about 5883.14 $Cd/m^2$ and the light uniformity is about 51.63%.

According to an exemplary embodiment, when higher brightness is required, the vertex angle of the upper prism may be adjusted to be in a range of about 55 to about 65 degrees, and the vertex angle of the lower prism may be adjusted to be in a range of about 95 to about 105 degrees. The range of the vertex angles of the upper prism and the lower prism may be modified according to external environment conditions when the display panel is manufactured.

FIG. 9B is a graph illustrating brightness of the light of the display panel measured when the vertex angle of the upper prism is about 75 degrees and the vertex angle of the lower prism is about 115 degrees.

Referring to FIG. 9B, it is shown that, when the vertex angle of the upper prism is about 75 degrees and the vertex angle of the lower prism is about 115 degrees, higher light uniformity is measured. Specifically, brightness of about 2800 to about 4200 $Cd/m^2$ is measured in most of an entire area of the display panel.

In an exemplary embodiment, the light uniformity is higher, however the brightness is lower. In an exemplary embodiment, the average brightness is about 3496.26 $Cd/m^2$ and the brightness in the center portion of the display panel is about 3630.60 Cd/m² and the light uniformity is about 77.42%.

According to an exemplary embodiment, when higher uniformity is required, the vertex angle of the upper prism may be adjusted to be in a range of about 70 to about 80 degrees, and the vertex angle of the lower prism may be adjusted to be in a range of about 110 to about 120 degrees. The range of the vertex angles of the upper prism and the lower prism may be modified according to external environment conditions when the display panel is manufactured.

FIG. 9C is a graph illustrating the brightness of the light of display panel measured when the vertex angle of the upper prism is about 70 degrees and the vertex angle of the lower prism is about 110 degrees.

Referring to FIG. 9C, when the vertex angle of the upper prism is about 70 degrees and the vertex angle of the lower prism is about 110 degrees, higher uniformity is measured. Brightness of about 4200 to about 9800 Cd/m² is measured in most area of the screen, and an area with lower brightness is lesser compared with the embodiment of FIG. 9B.

In an exemplary embodiment, both of the uniformity and the brightness are relatively good. In an exemplary embodiment, the average brightness is 4197.34 Cd/m² and the center brightness is about 4495.6 Cd/m² and the uniformity is 75.58%.

Thus, when higher brightness is required, the vertex angles of the upper prism and the lower prism may be about 60 degrees and about 110 degrees, respectively. When higher uniformity is required, the vertex angles of the upper prism and the lower prism may be about 75 degrees and about 115 degrees, respectively. When higher brightness and higher uniformity are required at the same time, the vertex angles of the upper prism and the lower prism may be about 70 degrees and about 110 degrees, respectively.

According to an exemplary embodiment, when higher brightness and higher uniformity are both required at the same time, the vertex angle of the upper prism may be adjusted to be in a range of about 65 to about 75 degrees, and the vertex angle of the lower prism may be adjusted in a range of about 105 to about 115 degrees. The vertex angles of the upper prism and the lower prism may be modified according to external environment conditions when the display panel is manufactured.

Figure 10:
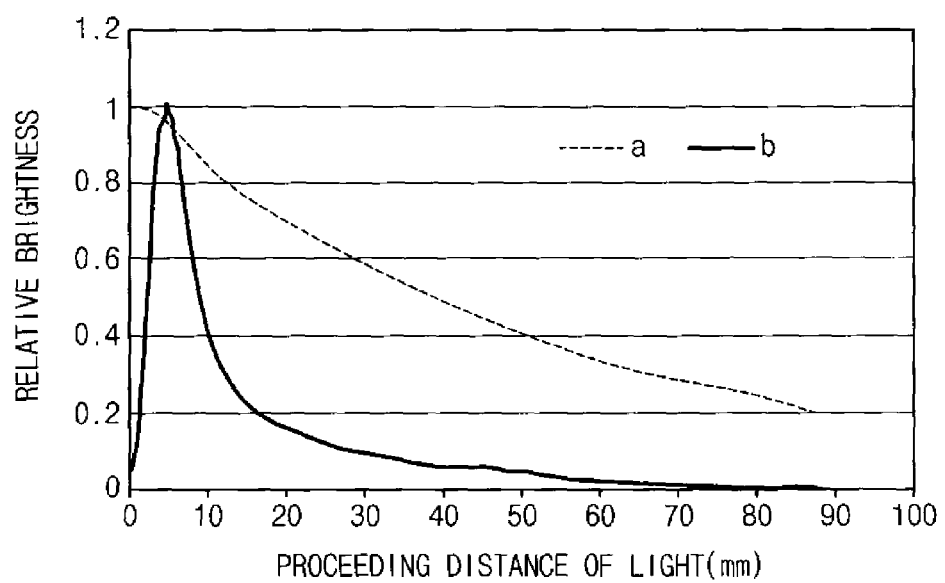
FIG. 10 is a graph illustrating relative brightness with respect to a proceeding distance of light of a display apparatus of the invention.

FIG. 10 is a graph illustrating brightness with respect to a proceeding distance of the light of the display apparatus of the invention.

Referring to FIG. 10, the brightness according to the proceeding distance of the light of the display apparatus of the invention is shown in a dotted line 'a' and the brightness of the conventional display apparatus without the light guide plate is shown in a solid line 'b'. In the case of the conventional display apparatus, as shown in the solid line 'b', the brightness of the light is quickly increased at an initial stage and is decreased sharply immediately after the initial stage. Thus, the uniformity of the light according to the light proceeding distance is not high.

In the conventional display apparatus, which does not include the light guide plate, the light is provided more intensively to an area closer to the light source, and the light cannot be sufficiently irradiated to an area farther away from the light source. Thus, at least two light source modules should be used in the conventional display apparatus. However, even when using two light source modules, the uniformity of the brightness according the light proceeding distance is not enhanced.

In an exemplary embodiment, as shown in the dotted line a, the brightness according to the light proceeding distance is not decreased sharply but gradually. The distribution of the brightness is more uniform than in the conventional display apparatus. In the display apparatus of an exemplary embodiment, the brightness is gradually decreased, and a dark spot is not seen on the screen. Also, a difference between a maximum brightness and a minimum brightness is smaller than in the conventional display apparatus.

As described above, according to the invention, a display apparatus having an edge type light source module without a light guide plate may be provided. Thus, a manufacturing cost may be reduced, a manufacturing process may be simplified, and a weight of a product may be reduced.

In addition, a display apparatus according to the invention may be thinner than the conventional display apparatus, which does not include a light guide plate The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display module comprising:
  a display panel including a display area and a non-display area;
  an upper prism layer including a plurality of upper prisms at a lower surface thereof, wherein the plurality of the upper prisms are parallel to one another;
  a lower prism layer including:
    a plurality of lower prisms parallel to one another and extending in a substantially perpendicular direction to the upper prisms at a lower surface of the lower prism; and
    an adhesive area which corresponds to the non-display area of the display panel and is in proximity of the plurality of lower prisms; and
  an adhesive part which is at a side of the upper prism layer and is adhered to the adhesive area of the lower prism layer and the non-display area of the display panel, wherein the adhesive part fixes the upper prism layer and the lower prism layer to each other.

2. The display module of claim 1,
  wherein the lower prisms of the lower prism layer extend toward a light source.

3. The display module of claim 1,
  wherein the lower prism layer comprises an elastic base film.

4. The display module of claim 1,
  wherein the adhesive part is adhered to a side of the display area of the display panel and the non-display area of the display panel.

5. The display module of claim 1,
  wherein the adhesive part comprises resin.

6. The display module of claim 2, wherein a vertex angle of each of the upper prisms is from about 50 degrees to about 70 degrees.

7. The display module of claim 2, wherein a vertex angle of each of the lower prisms is from about 80 degrees to about 120 degrees.

8. The display module of claim 2, wherein a vertex angle of each of the upper prisms is from about 55 degrees to about 65 degrees, and a vertex angle of each of the lower prisms is from about 95 degrees to about 105 degrees.

9. The display module of claim 2, wherein a vertex angle of each of the upper prisms is from about 70 degrees to about 80 degrees, and a vertex angle of each the lower prisms is from about 110 degrees to about 120 degrees.

10. The display module of claim 2, wherein a vertex angle of each of the upper prisms is from about 65 degrees to about 75 degrees, and a vertex angle of each of the lower prisms is from about 105 degrees to about 115 degrees.

11. The display module of claim 1, further comprising:
a diffusive layer between the lower prism layer and the display panel.

12. The display module of claim 11, wherein the diffusive layer comprises a diffusive bead.

13. The display module of claim 11, further comprising:
a polarized layer between the upper prism layer and the display panel.

14. A display apparatus comprising:
an upper frame;
a display module comprising:
 a display panel including a display area and a non-display area;
 an upper prism layer including a plurality of upper prisms at a lower surface thereof, wherein the plurality of the upper prisms are parallel to one another;
 a lower prism layer including a plurality of lower prisms at a lower surface thereof, wherein the plurality of the lower prisms are parallel to one another and extend in a substantially perpendicular direction to the upper prisms; and
 an adhesive part which is at a side of the upper prism layer and is adhered to the lower prism layer and to the non-display area of the display panel, wherein the adhesive part fixes the upper prism layer and the lower prism layer to each other,
a lower frame which is coupled with the upper frame; and
a light source module at a side of the lower frame.

15. The display apparatus of claim 14, wherein the lower prisms of the lower prism layer of the display module extend toward the light source module.

16. The display apparatus of claim 15, wherein the lower prism layer of the display module further comprises an adhesive area to which the adhesive part is adhered to, and
the adhesive area corresponds to the non-display area of the display panel and is in proximity of the lower prisms, and
the adhesive part is adhered to a side of the display area of the display panel and the non-display area of the display panel.

17. The display apparatus of claim 15, wherein a vertex angle of each of the upper prisms is about 70 degrees, and
a vertex angle of each of the lower prisms is about 110 degrees.

18. The display apparatus of claim 14, further comprising:
a reflective sheet at a bottom portion of the lower frame.

19. The display apparatus of claim 14, wherein the light source module comprises two light source sub modules, and
the two light source sub modules are at opposing sides of the lower frame.

* * * * *